United States Patent [19]
Brem et al.

[11] Patent Number: 5,609,018
[45] Date of Patent: Mar. 11, 1997

US005609018A

[54] COMBINED INSTALLATION FOR GAS AND STEAM TURBINES

[75] Inventors: Ernst Brem, Schlieren, Switzerland; Roland Ulrich, Tiengen, Germany; Peter W. Stadelmann, Thalwil, Switzerland

[73] Assignee: ABB Management AG, Baden, Switzerland

[21] Appl. No.: 510,507

[22] Filed: Aug. 2, 1995

[30] Foreign Application Priority Data

Aug. 19, 1994 [CH] Switzerland .................. 2554/94

[51] Int. Cl.⁶ ..................... F02C 6/18; F02C 7/20
[52] U.S. Cl. ............... 60/39.182; 60/39.31; 248/678
[58] Field of Search ................. 60/39.02, 39.182, 60/39.31, 39.33; 290/4 C; 248/639, 678, 679

[56] References Cited

U.S. PATENT DOCUMENTS 4,837,469  6/1989  Ward ........................... 310/53

*Primary Examiner*—Louis J. Casaregola
*Attorney, Agent, or Firm*—Burns, Doane, Swecker & Mathis, L.L.P.

[57] ABSTRACT

A combined installation configured as a single-shaft installation with common shafting (1) consists essentially of a gas turbine, a steam turbine, the generator (10), which is located between them, and the associated auxiliary systems (12). The generator (10) and the associated auxiliary systems (12) are arranged on a slab (8) which can be displaced transverse to the common shafting (1).

9 Claims, 2 Drawing Sheets

5,609,018

COMBINED INSTALLATION FOR GAS AND STEAM TURBINES

BACKGROUND OF THE INVENTION

1. Field of the Invention

The invention relates to a combined power plant installation configured as a single-shaft installation with common shafting, having a gas turbine, a steam turbine, the generator, which is located between them, and the associated auxiliary systems.

2. Discussion of Background

In such a combined power plant installation, known per se, the gas turbine and the steam turbine drive the common generator which is located between them. The machine foundation of this combined installation usually consists of a foundation slab in contact with the ground and of one or a plurality of platform units which are connected to the foundation slab by means of bearers. The machine components are secured on the upper slab, which has relieved regions for accommodating the machine components.

The configuration of the combined installation as a single-shaft installation means that only one generator is required. This reduces the costs and simplifies the operational procedure. Disadvantages do, however, occur when the rotor has to be taken out of the stator during maintenance or inspection work on the generator. Because of the design of the generator, the generator must be displaced sideways in order to permit the rotor to be withdrawn. For this purpose, the supply lines of the auxiliary systems, such as the hydrogen supply used for cooling, have to be disconnected and the generator has to be decoupled from the turbines and released from the upper slab. The generator is then usually raised by auxiliary means to the side where the maintenance work can be carried out. This leads to long dismantling times and reinstallation times, which in turn leads to a very time-intensive and therefore cost-intensive procedure. In the case of hydrogen-cooled generators, danger also arises due to the removal and reinstallation of the hydrogen supply because of leaks which may occur during the work and through which hydrogen can emerge.

SUMMARY OF TEE INVENTION

Accordingly, one object of this invention is to avoid long dismantling times and reinstallation times during maintenance work on the generator in a combined installation of the type mentioned at the beginning.

In the invention, this is achieved by the generator and the associated auxiliary systems being arranged on a slab which can be displaced transverse to the common shafting.

The advantages of the invention may be seen, inter alia, in the fact that the number of supply and removal conduits which have to be disconnected during maintenance work on the generator is markedly reduced because the common arrangement of the generator and the associated auxiliary systems on a displaceable slab which is separated from the machine foundation produces a single unit. This reduces the time required for the maintenance work and therefore lowers the costs because the combined installation can be brought back into operation earlier.

When hydrogen-cooled generators are used, furthermore, the risk of leaks is reduced because the connections between the hydrogen supply and the generator do not have to be disconnected.

The application of positioning appliances, which permit the slab to be aligned in its original position when it is pushed back, is particularly desirable. This ensures exact positioning of the generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
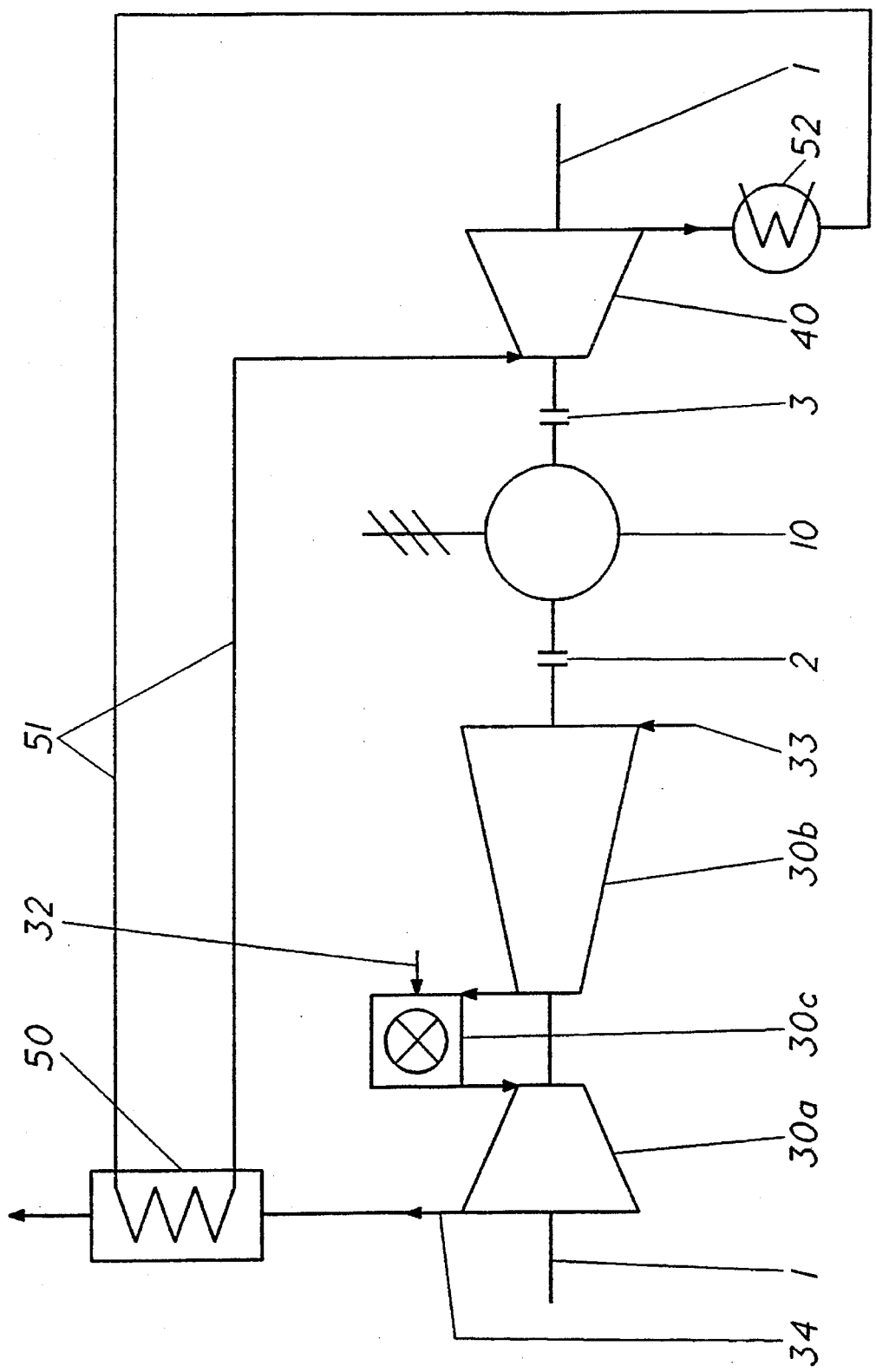
FIG. 1 shows, diagrammatically, a single-shaft combined installation.

Referring now to the drawings, wherein like reference numerals designate identical or corresponding parts throughout the several figures and parts of the installation not shown are, for example, the shaft bearings, the complete water/steam cycle, the exciter connected downstream of the generator and the safety casing which surrounds the generator and the auxiliary systems, in FIG. 1, common shafting 1 connects a gas turbine 30, comprising a compressor 30b, a combustion chamber 30c and the actual turbine 30a, an interposed generator 10 and a steam turbine 40. The common shafting 1 is formed of individual shafts which are connected by means of couplings 2 and 3. The flow directions of the working media are indicated by arrows.

In the compressor 30b, the air induced via an air inlet 33 is compressed and the compressed air is fed into the combustion chamber 30c. In this, fuel 32 is supplied to the combustion air and the fuel/air mixture is burned in a combustion space. The resulting hot gas is fed into the gas turbine 30a where it expands and part of the energy of the hot gas is converted into rotational energy. Heat energy is withdrawn from the exhaust gas 34 by means of a waste heat boiler 50 and, by this means, water is heated in a steam cycle 51. The resulting steam is employed, by means of a steam inlet 41, for operating the steam turbine 40. The steam emerging at the steam outlet 42 is condensed in a 52 and is returned to the steam cycle.

Figure 2:
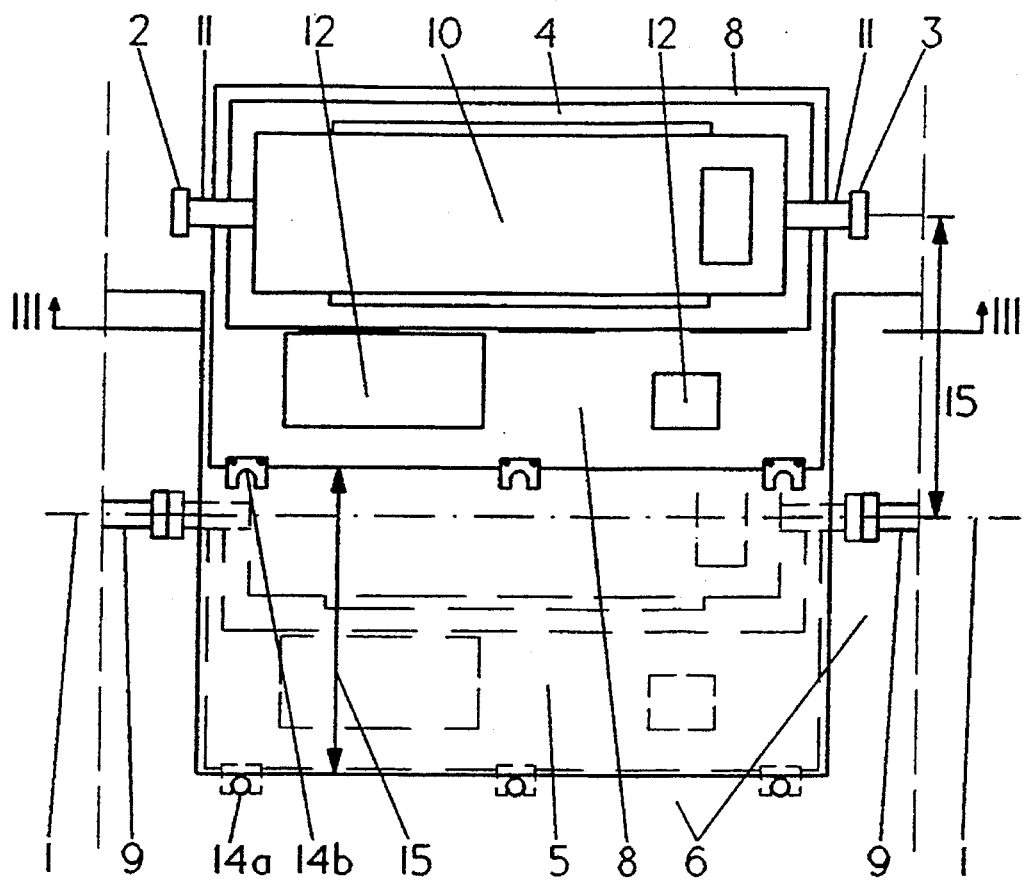
FIG. 2 shows a plan view onto the displaced generator.
Figure 3:
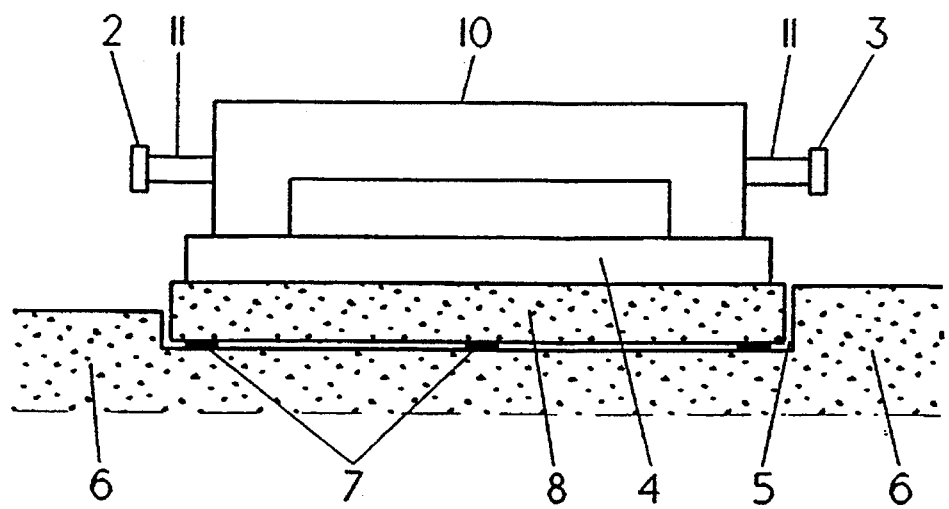
FIG. 3 shows a longitudinal section along the line III—III in FIG. 2.

During the erection of a combined installation, a machine foundation 6 is first prepared as shown in FIG. 3. A recess 5 is produced in the machine foundation in the region of the generator 10. After the machine foundation 6 has been prepared, a concrete slab 8 is cast in previously prepared formwork in the immediate vicinity of the recess 5. After the concrete has set, the concrete slab 8 is raised by auxiliary means and the formwork is removed. Sliding elements 7 in Teflon® or some other materials which can slide are fastened underneath the concrete slab and these sliding elements 7 extend parallel to the displacement path 15 indicated in FIG. 2. The concrete slab 8 is then lowered into the recess 5 in the position shown by broken lines in FIG. 2. The bottom of the recess 5 forms a flat surface which extends over the region of the slab 8 and over the displacement path region. The concrete slab is bolted to the machine foundation by means of anchoring elements, which are not shown. Positioning appliances 14, consisting of a pin 14a and a plate with a groove 14b are fastened to the concrete slab 8 and the machine foundation 6. The appliances corresponding to the positioning appliances 14 and which position the slab in height are not represented in FIG. 2. The positioning appliances permit the concrete slab to be repositioned after the procedure of displacing it back to its original location. A platform 4, on which the generator 10 is erected, is now prepared on the concrete slab. The stator is placed in position, the bearing pedestals are fitted, the rotor 11 is transported into the stator and is lowered into the bearings. The generator is aligned in its final position and is firmly connected to the platform 4. The electrical testing takes place with the aid of an electric motor, which is not shown. In parallel with this, the associated auxiliary systems 12, such as the hydrogen supply and the oil supply—including all the internal connections, such as cables and pipes—are, in addition to the generator, also mounted on the concrete slab 8.

In addition to the generator 10, the steam turbine and the gas turbine are also erected. They are only represented in FIG. 2 by their shaft ends 9. The generator 10 is connected to the shaft ends 9 by means of the couplings 2 and 3.

If, for example, maintenance work has to be carried out on the generator rotor 11, the combined installation 30, 10, 40 is shut down. The generator is decoupled from the gas turbine 30 and the steam turbine 40 at its couplings 2 and 3. The high-tension outputs of the generator, which are not shown, are disconnected. The anchoring elements between the concrete slab 8 and the machine foundation 6 are released. The concrete slab 8, together with the generator 10 and the auxiliary systems 12 arranged on it, is now ready to be displaced. Using hydraulic or mechanical means, the concrete slab is pushed out, transverse to the shafting 1 and along the displacement path 15, on the sliding elements 7 made of Teflon®, the concrete slab being laterally guided by the machine foundation 6. The concrete slab 8 is pushed out to the side, adjacent to the turbines 30 and 40, until the rotor 11 can be withdrawn parallel to the shafting 1.

After the maintenance work has been concluded, the rotor is transported back into the stator and aligned. The concrete slab 8 is pushed back by hydraulic means. The concrete slab is positioned in its original location by means of the positioning appliances 14 and fine adjustments may be made. The concrete slab 8 is then firmly reconnected to the machine foundation 6 by means of the anchoring elements. The rotor 11 is coupled onto the shaft ends 9 once again and the high-tension outputs are connected. The combined installation is now ready for operation again.

The invention is obviously not limited to the embodiment example shown and described. The slab 8, for example, can also consist of a metal frame in order to influence the dynamic behavior of the slab and the generator. The configuration, type and arrangement of the sliding elements and the groove/wedge shape of the positioning appliance can be arbitrarily selected to meet the requirements. The recess in the machine foundation for accommodating the concrete slab can, of course, also be replaced by other configuration arrangements such as guide elements fastened to the machine foundation at the sides.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A combined installation configured as a single-shaft installation with common shafting having a gas turbine, a steam turbine, a generator, which is located between the gas turbine and the steam turbine, and associated auxiliary systems of the generator, comprising a movable mounting slab positioned on sliding elements and in lateral guides on a machine foundation, wherein the lateral guides are formed by a recess in the machine foundation, and wherein the generator and the associated auxiliary systems are arranged on the slab, the slab is arranged between the gas turbine and the steam turbine, and the slab is displaceable transverse to the common shafting so that a rotor of the generator can be withdrawn from the generator.

2. The combined installation as claimed in claim 1, wherein the slab is equipped with at least one positioning appliance for positioning the slab relative to the shafting.

3. The combined installation as claimed in claim 2, wherein the positioning appliance comprises a wedge/groove system.

4. The combined installation as claimed in claim 1, further comprising means for firmly connecting the slab to a machine foundation to anchor the slab during operation of the generator.

5. A mounting system for a combined power plant installation having a gas turbine, a generator and a steam turbine operating on a single common shafting, and a cooling system connected to the generator, the gas turbine and the steam turbine being mounted on a main foundation, comprising:

a slab movably disposed between mounting locations for the gas turbine and steam turbine on a main foundation, wherein the generator is mounted on the slab and disposed between the gas turbine and the steam turbine and releasably coupled to the shafting, and the cooling system is mounted on the slab; and means for movably supporting the slab for movement transverse to the shafting a distance sufficient to permit removal of a rotor of the generator, comprising sliding elements supporting the slab on the main foundation and lateral guides in the main foundation for guiding movement of the slab on the main foundation, wherein the lateral guides are formed by a recess formed in the main foundation in which the slab is disposed.

6. The foundation system as claimed in claim 5, further comprising means for positioning the slab relative to the main foundation to align the generator for coupling to the shafting.

7. The foundation system as claimed in claim 6, wherein the means for positioning the slab comprises wedge means mounted to the slab and mating groove means mounted to the main foundation.

8. The foundation system as claimed in claim 5, comprising means for anchoring the slab to the main foundation to prevent movement during operation of the generator.

9. The foundation system as claimed in claim 5, wherein an oil supply system for the generator is mounted on the slab and connected to supply oil to the generator.

* * * * *